(12) United States Patent
Leedberg et al.

(10) Patent No.: US 8,112,487 B2
(45) Date of Patent: Feb. 7, 2012

(54) SYSTEM AND METHOD FOR MESSAGE FILTERING

(75) Inventors: Gregory Leedberg, Milton, MA (US);
Kenneth D. Carey, Boston, MA (US);
George W. Spencer, Jr., Westborough, MA (US)

(73) Assignee: Raytheon Company, Waltham, MA (US)

( * ) Notice: Subject to any disclaimer, the term of this patent is extended or adjusted under 35 U.S.C. 154(b) by 277 days.

(21) Appl. No.: 12/468,112

(22) Filed: May 19, 2009

(65) Prior Publication Data

US 2009/0292784 A1 Nov. 26, 2009

Related U.S. Application Data

(60) Provisional application No. 61/128,321, filed on May 20, 2008.

(51) Int. Cl.
*G06F 15/16* (2006.01)
(52) U.S. Cl. .... 709/206; 709/204; 707/694; 379/100.08
(58) Field of Classification Search ........... 709/206–207
See application file for complete search history.

(56) References Cited

U.S. PATENT DOCUMENTS

| | | | |
|---|---|---|---|
| 5,086,394 A | 2/1992 | Shapira | |
| 5,619,648 A | 4/1997 | Canale et al. | |
| 5,704,017 A | 12/1997 | Heckerman et al. | |
| 6,073,142 A | 6/2000 | Geiger et al. | |
| 6,101,531 A | 8/2000 | Eggleston et al. | |
| 6,157,915 A | 12/2000 | Bhaskaran et al. | |
| 6,330,610 B1 | 12/2001 | Docter et al. | |
| 6,336,134 B1 | 1/2002 | Varma | |
| 6,643,705 B1 | 11/2003 | Wallace et al. | |
| 6,778,941 B1 | 8/2004 | Worrell et al. | |
| 6,804,336 B2* | 10/2004 | Chiu | 379/100.08 |
| 6,829,613 B1* | 12/2004 | Liddy | 707/694 |
| 6,832,245 B1 | 12/2004 | Isaacs et al. | |
| 6,886,169 B2 | 4/2005 | Wei | |
| 6,968,179 B1 | 11/2005 | DeVries | |
| 7,152,111 B2 | 12/2006 | Allred et al. | |

(Continued)

FOREIGN PATENT DOCUMENTS

EP 1 193 925 A2 4/2002
(Continued)

OTHER PUBLICATIONS

Notification of Transmittal of the International Search Report and the Written Opinion of the International Searching Authority, or the Declaration, PCT/US2009/044452, dated Aug. 12, 2009, 3 pages.

(Continued)

*Primary Examiner* — Michael Y Won
*Assistant Examiner* — Hua Fan
(74) *Attorney, Agent, or Firm* — Daly, Crowley, Mofford & Durkee, LLP (57) ABSTRACT

A collaborative messaging system and method includes, in a communications engine, a plurality of message interrogators to process a message from a sender to a receiver. The plurality of message interrogators includes a message adjudicator configured to compare message information from the sender with message information obtained by the message adjudicator and to modify the message information from the sender to a more restrictive value. The plurality of message interrogators further includes a message validator configured to allow or deny the message based upon the modified message information.

10 Claims, 7 Drawing Sheets

U.S. PATENT DOCUMENTS

| | | | |
|---|---|---|---|
| 7,185,057 B2 | 2/2007 | Brown et al. | |
| 7,200,638 B2 | 4/2007 | Lake | |
| 7,249,162 B2 | 7/2007 | Rounthwaite et al. | |
| 7,299,264 B2 | 11/2007 | Yang-Huffman | |
| 7,343,564 B2 | 3/2008 | Othmer | |
| 7,363,319 B2 | 4/2008 | Cappellini | |
| 7,369,505 B2 | 5/2008 | Mengerink | |
| 7,370,283 B2 | 5/2008 | Othmer | |
| 7,383,307 B2 | 6/2008 | Kirkland et al. | |
| 7,430,724 B2 | 9/2008 | Othmer | |
| 7,437,408 B2* | 10/2008 | Schwartz et al. | 709/204 |
| 7,441,203 B2 | 10/2008 | Othmer et al. | |
| 7,511,634 B2 | 3/2009 | Stehle et al. | |
| 7,512,569 B2 | 3/2009 | Isaacs | |
| 7,523,137 B2 | 4/2009 | Kass et al. | |
| 7,523,226 B2 | 4/2009 | Anderson et al. | |
| 7,526,573 B2 | 4/2009 | Busey | |
| 7,574,170 B2 | 8/2009 | Jendbro | |
| 7,574,479 B2 | 8/2009 | Morris et al. | |
| 7,581,166 B2 | 8/2009 | Renger et al. | |
| 7,590,691 B2 | 9/2009 | Gonsalves et al. | |
| 7,603,437 B2 | 10/2009 | Busey | |
| 7,680,890 B1* | 3/2010 | Lin | 709/206 |
| 2001/0046069 A1 | 11/2001 | Jones | |
| 2002/0083127 A1 | 6/2002 | Agrawal | |
| 2004/0136513 A1* | 7/2004 | Chiu | 379/100.08 |
| 2005/0055403 A1 | 3/2005 | Brittan | |
| 2005/0193062 A1 | 9/2005 | Komine et al. | |
| 2005/0234928 A1 | 10/2005 | Shkvarchuk | |
| 2005/0250552 A1 | 11/2005 | Eagle et al. | |
| 2005/0267844 A1* | 12/2005 | Gallant et al. | 705/51 |
| 2005/0267974 A1 | 12/2005 | Panasyuk et al. | |
| 2006/0036695 A1 | 2/2006 | Roinik | |
| 2006/0073812 A1 | 4/2006 | Punaganti Venkata et al. | |
| 2006/0133385 A1 | 6/2006 | Trossen et al. | |
| 2006/0173985 A1 | 8/2006 | Moore | |
| 2006/0230021 A1 | 10/2006 | Diab et al. | |
| 2006/0259474 A1 | 11/2006 | Granito | |
| 2006/0265489 A1 | 11/2006 | Moore | |
| 2007/0043617 A1 | 2/2007 | Stein et al. | |
| 2007/0083536 A1 | 4/2007 | Darnell et al. | |
| 2007/0083894 A1 | 4/2007 | Gonsalves et al. | |
| 2007/0100836 A1 | 5/2007 | Eichstaedt et al. | |
| 2007/0100959 A1 | 5/2007 | Eichstaedt et al. | |
| 2007/0100960 A1 | 5/2007 | Eichstaedt et al. | |
| 2007/0013158 A1 | 6/2007 | LaBiche et al. | |
| 2007/0130158 A1 | 6/2007 | LaBiche et al. | |
| 2007/0162432 A1 | 7/2007 | Armstrong et al. | |
| 2007/0162560 A1 | 7/2007 | Jin | |
| 2007/0168461 A1 | 7/2007 | Moore | |
| 2007/0174389 A1 | 7/2007 | Armstrong et al. | |
| 2007/0203977 A1 | 8/2007 | Wu et al. | |
| 2007/0225047 A1 | 9/2007 | Bakos | |
| 2008/0010353 A1 | 1/2008 | Rounthwaite et al. | |
| 2008/0046369 A1 | 2/2008 | Wood | |
| 2008/0059964 A1 | 3/2008 | Khodabakchian et al. | |
| 2008/0104226 A1 | 5/2008 | Seshasai | |
| 2008/0104520 A1 | 5/2008 | Swenson et al. | |
| 2008/0126476 A1 | 5/2008 | Nicholas et al. | |
| 2008/0208972 A1 | 8/2008 | Chou et al. | |
| 2009/0061925 A1 | 3/2009 | Finkelstein et al. | |
| 2009/0070419 A1 | 3/2009 | Gilfix et al. | |
| 2009/0089380 A1 | 4/2009 | Wang et al. | |
| 2009/0172773 A1 | 7/2009 | Moore | |
| 2009/0248729 A1 | 10/2009 | Bruno, Jr. et al. | |

FOREIGN PATENT DOCUMENTS

| | | |
|---|---|---|
| EP | 1 193 925 A3 | 4/2002 |
| EP | 1 883 019 A1 | 1/2008 |
| GB | 2 313 524 A | 11/1997 |
| WO | WO 01/98856 A2 | 12/2001 |
| WO | WO 01/98856 A3 | 12/2001 |
| WO | WO 2004/031976 A1 | 4/2004 |
| WO | WO 2005/083934 A1 | 9/2005 |
| WO | WO 2005/125070 A2 | 12/2005 |
| WO | WO 2005/125070 A3 | 12/2005 |
| WO | WO 2006/088952 A2 | 8/2006 |
| WO | WO 2006/088952 A3 | 8/2006 |
| WO | WO 2007/147207 A1 | 12/2007 |

OTHER PUBLICATIONS

International Search Report, PCT/US2009/044452, dated Aug. 12, 2009, 4 pages.

Written Opinion of the International Searching Authority, PCT/US2009/044452, dated Aug. 12, 2009, 6 pages.

Office Action dated Feb. 16, 2011 for U.S. Appl. No. 12/468,101, 22 pages.

Response to Office Action dated Feb. 16, 2011 for U.S. Appl. No. 12/468,101, 12 pages.

Notification Concerning Transmittal of International Preliminary Report on Patentability (Chapter 1 of the Patent Cooperation Treaty), PCT/US2009/044454, date of mailing Dec. 2, 2010, 2 pages.

Written Opinion of the International Searching Authority, PCT/US2009/044454, date of mailing Dec. 2, 2010, 7 pages.

Notification of Transmittal of the International Search Report and the Written Opinion of the International Searching Authority, or the Declaration, PCT/US2009/044454 dated Jul. 30, 2009, 3 pages.

International Search Report, PCT/US2009/044454 dated Jul. 30, 2009, 4 pages.

Written Opinion of the International Searching Authority, PCT/US2009/044454 dated Jul. 30, 2009, 9 pages.

King et al.: "An alternative implementation of the reference monitor concept (military messaging, secure)" Proceedings of the Aerospace Computer Security Applications Conference. Orlando, Dec. 12-16, 1988; Washington, IEEE Comp. Soc.Press, US, vol. Conf. 4, Dec. 12, 1988, pp. 159-166, XP010014556. ISBN: 978-0-8186-0895-7, p. 160, right-hand column, line 25-line 39; p. 163, left-hand column, line 46—right-hand column, line 37.

U.S. Appl. No. 12/468,099, Gregory Leedberg, et al., filed on May 19, 2009, 35 pages.

U.S. Appl. No. 12/468,100, Gregory Leedberg, et al., filed on May 19, 2009, 31 pages.

U.S. Appl. No. 12/468,101, Gregory Leedberg, et al., filed on May 19, 2009, 30 pages.

U.S. Appl. No. 12/468,116, Kenneth D. Carey, et al., filed on May 19, 2009, 41 pages.

"Love: Japanese Style", Yukari Iwatani, Wired Magazine Online, Jun. 11, 1998, 2 pages, http://www.wired.com/culture/lifestyle/news/1998/06/12899.

"Social Serendipity", MIT Media Lab: Reality Mining, Mar. 9, 2009, 10 pages, http://reality.media.mit.edu/serendipity.php.

Notification of Transmittal of the International Search Report and the Written Opinion of the International Searching Authority, or the Declaration, PCT/US2009/044450 dated Oct. 6, 2009, 3 pages.

International Search Report Form PCT/ISA/210, PCT/US2009/044450 dated Oct. 6, 2009, 4 pages.

Notification Concerning Transmittal of International Preliminary Report on Patentability (Chapter 1 of the Patent Cooperation Treaty), PCT/US2009/044450, date of mailing Dec. 2, 2010, 2 pages.

Written Opinion of the International Searching Authority, PCT/US2009/044450, date of mailing Dec. 2, 2010, 5 pages.

Notification Concerning Transmittal of International Preliminary Report on Patentability (Chapter 1 of the Patent Cooperation Treaty)/ International Preliminary Report on Patentability, PCT/US2009/044451, date of mailing Dec. 2, 2010, 2 pages.

Notification of Transmittal of the International Search Report and the Written Opinion of the International Searching Authority, or the Declaration, PCT/US2009/044451 date of mailing Oct. 6, 2009, 3 pages.

International Search Report, Form PCT/ISA/210, PCT/US2009/044451 date of mailing Oct. 6, 2009, 4 pages.

Written Opinion of the International Searching Authority, PCT/US2009/044451 date of mailing Oct. 6, 2009, 6 pages.

Notification of Transmittal of The International Search Report and the Written Opinion of the International Searching Authority, or the Declaration/International Search Report, PCT/US09/44453, date of mailing Jun. 15, 2010, 3 pages.

Written Opinion of the International Searching Authority, PCT/US09/44453, date of mailing Jun. 15, 2010, 4 pages.
Notification Concerning Transmittal of the International Preliminary Report on Patentability (Chapter 1 of the Patent Cooperation Treaty)/International Preliminary Report on Patentability, PCT/US2009/044453, date of mailing Dec. 2, 2010, 2 pages.
Notification of Transmittal of the International Search Report and the Written Opinion of the International Searching Authority, or the Declaration, PCT/US2009/044452, dated Aug. 12, 2009, 3 pages.
International Search Report, PCT/US2009/044452, dated Aug. 12, 2009, 4 pages.
Written Opinion of the International Searching Authority, PCT/US2009/044452, dated Aug. 12, 2009, 6 pages.
Notification Concerning Transmittal of the International Preliminary Report on Patentability (Chapter 1 of the Patent Cooperation Treaty)/International Preliminary Report on Patentability, PCT/US2009/044452, date of mailing Dec. 2, 2010, 2 pages.
"Love: Japanese Style", Yukari Iwatani, Wired Magazine Online, Jun. 11, 1998, 2 pages, http://www.wired.com/culture/lifestyle/news/1998/06/12899, last accessed Jan. 13, 2011.
"Social Serendipity", MIT Media Lab: Reality Mining, Mar. 9, 2009, 10 pags, http://reality.media.mit.edu/serendipity.php, last accessed Jan. 13, 2011.

Brok J. et al: "Enabling New Services By Exploiting Presence and Context Information in IMS", Bell Labs Technical Journal, Wiley, CA, US, vol. 4, No. 10, Jan. 1, 2006, pp. 83-100, XP001239288, ISSN: 1089-7089.
3GPP: "$3^{rd}$ Generation Partnership Project; Technical Specification Group Services and System Aspects; Presence Service; Architecture and functional description (release 6)", 3GPP TS 23.141 v. 6.1.0, (Dec. 2002) Technical Specification; $3^{rd}$ Generation Partnership Project (3GPP), Mobile Competence Centre; 650, Route Des Lucioles; F-06921 Sophia-Antipolis Cedex; France, vol. SA WG5, No. Sophia Antipolis, France; 20030120, Jan. 10, 2003, XP050295829, pp. 1-31.
USPTO Office Action dated Sep. 8, 2011 for U.S. Appl. No. 12/468,116, 20 pages.
Office Action dated Mar. 10, 2011 and response to Office Action filed Jun. 2, 2011 for U.S. Appl. No. 12/468,116, filed May 19, 2009.
Office Action dated Jun. 10, 2011 for U.S. Appl. No. 12/468,101, filed May 19, 2009, 17 pages.
Office Action dated Jun. 22, 2011 for U.S. Appl. No. 12/468,116, filed May 19, 2009, 18 pages.

* cited by examiner

SYSTEM AND METHOD FOR MESSAGE FILTERING

RELATED APPLICATIONS

This application claims the benefit of U.S. Provisional Application No. 61/128,321 filed May 20, 2008 under 35 U.S.C. §119(e) which application is hereby incorporated herein by reference in its entirety.

FIELD OF THE INVENTION

The subject matter described herein generally relates to message filtering for collaborative messaging and in particular, to message filtering in collaborative messaging based upon message information from senders and obtained message information.

BACKGROUND

As is known in the art, so-called "chat" or "instant messaging" services enable users to compose and send messages to other users as well as receive messages from the other users. As is also known in the art, many of these services allow rule-based message processing to enhance messaging functionality. For example, chat services may perform text-based message processing to highlight key words in a conversion. Still further, users may add icons to messages, for example, emotions to indicate expressions, and include abbreviated expressions, for example "LOL" for laugh-out-loud.

SUMMARY

In accordance with the systems, techniques, and concepts described herein, a collaborative messaging system includes a communications engine, including a plurality of message interrogators to process a message from a sender to a receiver. The plurality of message interrogators includes a message adjudicator configured to process message information and a message validator configured to allow or deny the message based upon the processed message information.

In further embodiments, the system includes one or more of the following features: based upon a comparison of the message information, the message adjudicator is further configured to modify at least a portion of the message information to a more restrictive value; based upon a comparison of the message information, the message adjudicator is further configured to modify at least a portion of the message information to a less restrictive value; the message adjudicator is further configured to define receiver classification message information to indicate a classification level of the message receiver; the message adjudicator is further configured to define sender classification message information to indicate a classification level of the message sender; the message adjudicator is further configured to define content classification message information to indicate a classification level of the message content; the message adjudicator is further configured to filter the content of the message based upon the processed message information; the message adjudicator is further configured to remove at least a portion of the content of the message; at least a portion of removed content is classified material; at least a portion of removed content is offensive material; at least a portion of the message information includes receiver classification information to indicate a classification level of the receiver, wherein the message validator is further configured to allow or deny the message based upon the receiver classification information; at least a portion of the message information includes content classification information to indicate a classification level of the message content, wherein the message validator is further configured to allow or deny the message based upon the content classification information, and; a portion of the message information includes receiver classification information to indicate a classification level of the receiver, and another portion of the message information includes content classification information to indicate a classification level of the message content, wherein the message validator is further configured to allow or deny the message based upon a comparison of the receiver classification information to the content classification information.

In another aspect, a collaborative messaging system includes a communications engine, including a plurality of message interrogators to process a message from a sender to a receiver. The plurality of message interrogators includes a message adjudicator configured to compare message information from the sender with message information obtained by the message adjudicator and to modify the message information from the sender to a more restrictive value, and a message validator configured to allow or deny the message based upon the modified message information.

In further embodiments, the system includes one or more of the following features: the message adjudicator is further configured to obtain message receiver information and the message validator is further configured to allow or deny the message based upon the obtained message receiver information, and; the message adjudicator is further configured to filter the message content based upon the modified message information.

In a further aspect, a collaborative messaging system includes a communications engine including a plurality of message interrogators to process a message from a sender to a receiver. The message includes message sender information and message content information. The plurality of message interrogators includes a message adjudicator configured to compare message information from the sender with message information obtained by the message adjudicator, the obtained message information comprising message sender information, message receiver information, and message content information, modify the message information from the sender to a more restrictive of the message sender information from the sender and the obtained message sender information and the message content information from the sender and the obtained message content information, and filter the message content based upon the modified message information and the obtained receiver information. The plurality of message interrogators includes a message validator configured to allow or deny the message based upon the modified message information and the obtained message receiver information.

In further embodiments, the system includes one or more of the following features: the message adjudicator filters the message content by removing classified material from the message content, and; the message adjudicator filters the message content by removing offensive material from the message content.

In another aspect, a collaborative messaging method includes, in a communications engine, processing a message from a sender to a receiver, the message comprising message sender information, message content, and message content information. Processing the message includes comparing message information from the sender with obtained message information, the obtained message information comprising obtained message sender information, obtained message receiver information, and obtained message content information, modifying the message information from the sender to a more restrictive value of the message sender information from the sender and the obtained message sender information, and the message content information from the sender and the obtained message content information, filtering the message content based upon the modified message information and the obtained message receiver information, and allowing or denying the message based upon the modified message information and the obtained message receiver information.

In further embodiments, the method includes one or more of the following features: modifying the message information from the sender to a less restrictive value of the message sender information from the sender and the obtained message sender information, and the message content information from the sender and the obtained message content information; the message sender information further comprises message sender classification information and the obtained message information further comprises obtained sender classification information, and further including modifying the message information to a more restrictive value of the message sender classification information and the obtained sender classification information; the message content information further includes message content classification information and the obtained message information further comprises obtained content classification information, and further including modifying the message information to a more restrictive value of the message content classification information and the obtained content classification information; the message information further includes message receiver classification information and the obtained message information further includes obtained receiver classification information, and further including modifying the message information to a more restrictive value of the message receiver classification information and the obtained receiver classification information; the message sender information further includes message sender classification information and the obtained message information further includes obtained sender classification information, and modifying the message information further includes modifying the message sender information to a more restrictive value of the message sender classification information and the obtained sender classification information; filtering the message content further includes removing classified material from the message content, and; filtering the message content further includes removing offensive material from the message content.

Conventional chat services provide rule-based processing and other message enhancement features. However, such features are limited during emergency and/or military situations in which events rapidly unfold in unpredictable ways. For example, rule-based processing may not be able to adjust to changing or unknown environmental factors or accommodate the dynamic needs or desires of persons involved in an incident, such as joint responders, victims, eye-witnesses, etc. Therefore, although chat services offer useful and convenient messaging features, they are unable to accommodate more dynamic environments during which people must collaborate and share information with each other to mitigate the consequences of an event. This may result in inefficiencies, misinformation, poor planning, and/or inadequate problem resolution. Worse yet, lives and property may be at stake, as people fail to mitigate the consequences of an event.

The inventive concepts described herein enable message filtering based on message sender, receiver, and/or message content information. Such information may be provided by users who collaborate and share information with other users. In one embodiment, the information is pre-configured, such as by administrators with special access privileges. In the same or different embodiment, the information is automatically generated.

In one embodiment, a message adjudicator processes the message information and content, including comparing, modifying, and filtering the information and content based on obtained information from other sources. Still further, a message validator allows or denies messages, which may be based on the processed message information, such as the result of a classification service. Other message interrogators can perform other functions to support collaboration and sharing of information, such as message archiving and/or message event handling.

Advantageously, the inventive concepts provide advanced message filtering to meet the demands of dynamic environments. Persons who work together to mitigate the consequences of an event (e.g. a natural disaster, terrorist event, etc.) and/or accomplish a task-at-hand (e.g. military operations, business processes, organizational functions, etc.) can use the inventive concepts to process, modify, and/or validate messages based on dynamic information, as may be supplied by message senders and/or message receivers, pre-configured, automatically-generated, and obtained from other sources of a collaborative and information sharing environment.

BRIEF DESCRIPTION OF THE DRAWINGS

The foregoing features of this invention, as well as the invention itself, may be more fully understood from the following description of the drawings in which.

DETAILED DESCRIPTION

Figure 1:
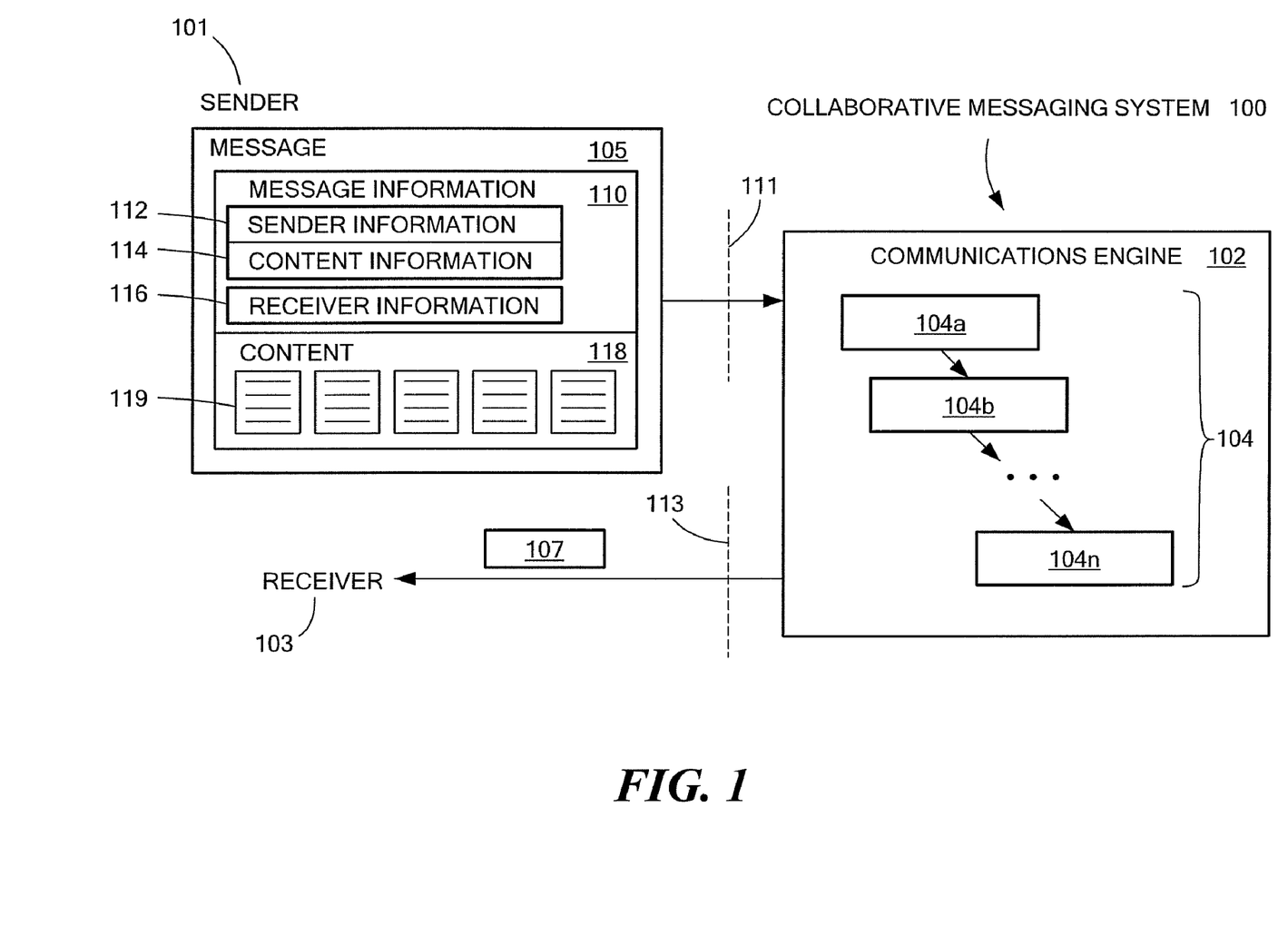
FIG. 1 is a block diagram of an embodiment of a collaborative messaging system according to the invention.

Referring to FIG. 1, a collaborative messaging system 100 includes a communications engine 102 including a plurality of message interrogators (generated denoted by reference numeral 104) to process a message 105 from a sender 101 to a receiver 103. In one embodiment, the sender 101 sends the message 105 over a network 111 to the communications engine 102. The network 111 includes, but is not limited to, the Internet or an intranet. In a further embodiment, the communications engine 102 sends the processed message 107 to the receiver 103 over network 113, which is the same as network 111.

In another embodiment, network 113 is different than network 111. For example, network 111 may be an organization's intranet for receiving the message 105 from the sender 101 who is an authorized member of the organization. The communications engine 102 processes the message 105 and sends the processed message 107 to the receiver 103 over network 113, which is a public network, such as the Internet.

The message 105 includes message information 110 including message sender information 112 and/or message content information 114. In a further embodiment, the message information 110 includes message receiver information 116. The message 105 also includes message content 118. In one embodiment, the message content 118 is text-based 119. In the same or different embodiment, the message content 118 is video-based and/or audio-based and/or a combination thereof.

In one embodiment, the sender 101 inputs at least a portion of the message 105 using a client device including, but not limited to, a mobile device (or other handheld device), a laptop computer, or a desktop computer. The sender 101 may use a user interface enabled on the client device to input the message content 118 and/or message information 110. In one exemplary application, the user interface is implemented in a windowing system supported by an operating system such as Microsoft Windows™ manufactured by Microsoft Corporation of Redmond, Wash.

For example, the sender 101 may use one or more user interface text input boxes and/or item selection lists and input hardware such as a mouse, keyboard, tablet, pointer, etc., to compose and review a text message (i.e. message content 118) and message information 110, such as a classification level of the sender 101 and/or a classification level of the message content 118 and/or a classification level of the receiver 103. Generally, classification level of a person (i.e. a sender 101 and/or a receiver 103) refers to that person's privileges to view and access information. With regard to content, classification level refers to the required classification of a person to view and access the content. It should be noted that the message information 110 is not limited classification levels, but includes other kinds of message information 110, such as message priority level, message reliability, descriptive information related to objects at the scene of an incident, such as automobile in a multi-vehicle crash, etc.

The sender 101 may use a user interface submit button to send the message 105 to the communications engine 102. Alternatively, or in a addition to the submit button, the sender 101 may use a hardware button on the client device to send the message 105, such as a toggle button or wheel button on a side of the client device. It should be also noted that the message content 118 and message information 110 may inputted in other ways, such as using a keypad on a telephonic device, an audio/video recorder, a camera, or a combination thereof.

Applications using the inventive concepts will now be described in more detail. In one example law enforcement application, the sender 101, who is a law enforcement official, uses the collaborative messaging system 100 to send text-messages related to a hit-and-run accident involving a hit-and-run vehicle and an injured party. The sender 101 composes a first text message including message content 118 related to the accident. A first eye witness informs the law enforcement official that the hit-and-run vehicle was a white Cadillac and the law enforcement official adds this information to the first message. However, because the first eye witness only had a glimpse of the vehicle, the law enforcement official adds message reliability information to the first message to indicate that the reported hit-and-run vehicle make and color are unreliable. The law enforcement official sends the first message to the receiver 103 who is a dispatcher.

A second eye witness who had a more extensive look at the hit-and-run vehicle informs the law enforcement official that the vehicle was light blue and had an unpainted left-rear door. The law enforcement official composes a second message with the updated information and indicates that the message information is highly reliable, and sends the second message.

In the same or different embodiment, the message information 110 is preconfigured and/or automatically generated. For example, in one embodiment, an administrator of the collaborative message system 100 pre-configures message information 110 on the client device prior to use. For example, the administrator may pre-configure message information 110 to indicate the trustworthiness of the sender 101. For example, in one application, the sender 101 is a private party volunteer enlisted to assist in military operations (e.g., a local resident enlisted to provide information on enemy troop sightings, targets, etc.).

Here, before providing the client device to the private party volunteer for use with the collaborative messaging system, the administrator pre-configures the trustworthiness information on the client device to a low value to indicate that messages sent on the client device are not very trustworthy. When the private party volunteer 101 sends a message 105 on the client device, the trustworthiness information is automatically sent with the message 105. For example, the trustworthiness information may be stored in a memory on the client device and automatically loaded and appended to the message 105. In one embodiment, at least a portion of the message information 110, such as the trustworthiness information, is saved in a protected memory inaccessible to the sender 101. Still further, the trustworthiness information may be re-configured to a higher value, for example, when the private party volunteer proves to be trustworthy over time.

In still another embodiment, the message information 110 is automatically generated. For example, the client device may incorporate a geographic positioning chip that automatically generates the sender's geographic position and appends it to the message 105.

Figure 1A:
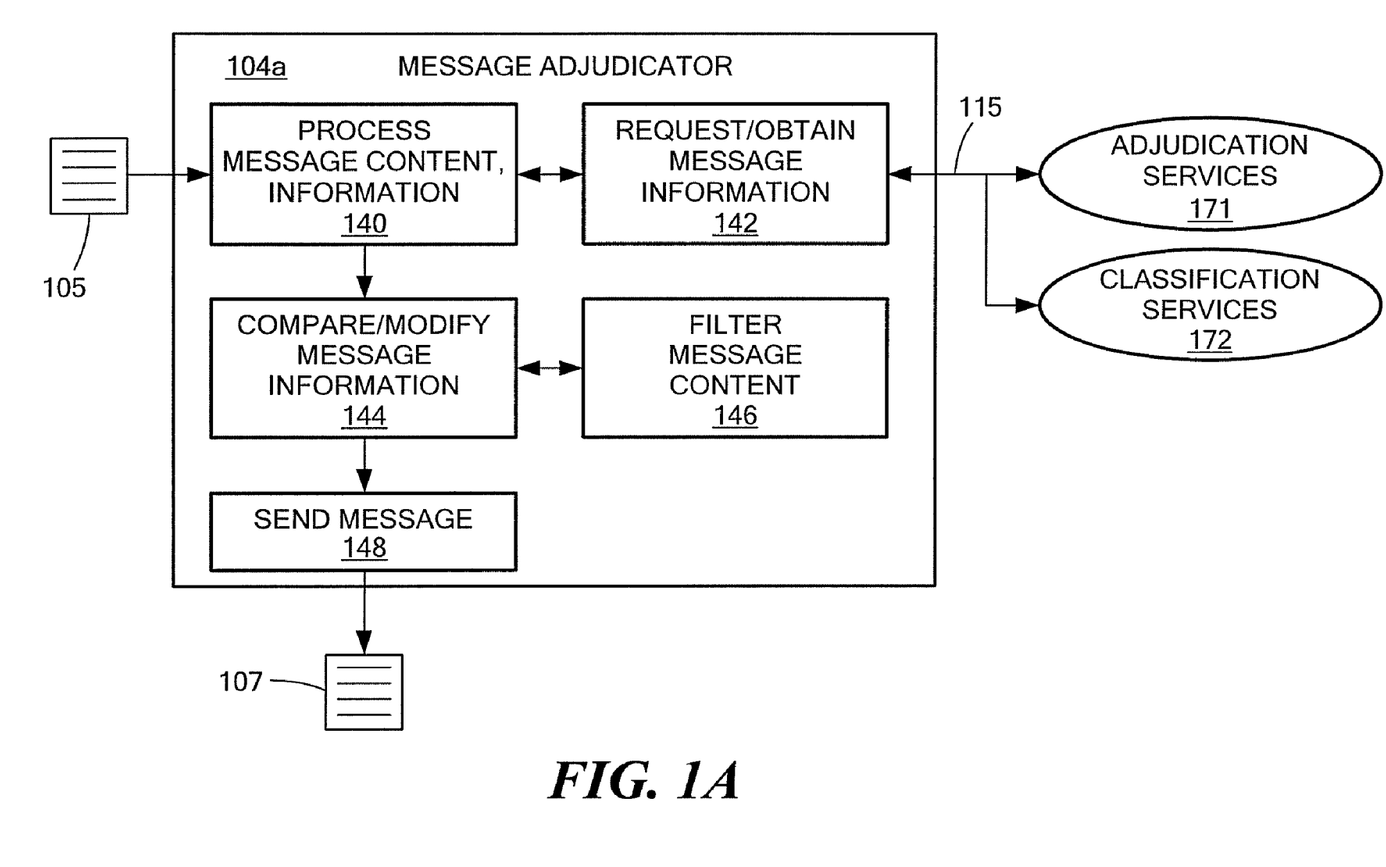
FIG. 1A is a block diagram of an embodiment of a message adjudicator according to the invention.

Referring again to FIG. 1, the plurality of message interrogators 104 includes, but is not limited to, a message adjudicator 104a configured to process message information 110 and a message validator 104b configured to allow or deny the message 105 based upon the processed message information. Referring to FIG. 1A, in which like elements with FIG. 1 are shown with like reference numerals, in one embodiment, the message adjudicator 104a processes message content and message information of a message 105 (140), obtains message information (142), compares the message information to the obtained message information and modifies the message information (144).

Referring again to FIG. 1, in a non-limiting application that uses an embodiment of the collaborative message system for responding to terrorist threats, the message adjudicator 104a compares the message information 110 from the sender 101 related to a threat level to obtained message information related to the threat level. In one embodiment, the message adjudicator 104a obtains the threat level from a military command-and-control system external to the communications engine 102. For example, the communications engine 102 may request the threat level information from the military command-and-control system over a network. The request may be in the form of a hypertext transfer protocol (HTTP) request, although other request formats may be used. In response, the military command-and-control system processes the request and sends information back to message adjudicator 104a. Such responses include information (i.e. the obtained information) which in one embodiment is one or more data packets, bit streams, data files, such as an extensible markup language (XML) file, or a combination thereof.

In some instances, the threat levels may not match. For example, the threat level from the sender 101 may be higher than the obtained treat level, as may be the case when the sender 101 mischaracterizes the threat level due to out-dated information. Here, the message adjudicator 104a modifies the threat level to the obtained threat level. In the same or different embodiment, the sender 101 is a joint commander with the authority to change the threat level (e.g. the joint commander may raise or lower the threat level due to the joint commander's observations in the field). In such an instance, the message adjudicator 104a does not modify the threat level; rather, the message adjudicator 104a updates the external system with the joint commander's indicated threat level.

Referring now to FIGS. 1 and 1A, in one embodiment, the message adjudicator 104a obtains message information from adjudication services 171 and/or classification services 172. In one embodiment, the adjudication services 171 and/or classification services 172 are external to the collaborative messaging system 100 and are accessed over a network 115. In an example application, the message adjudicator 104a obtains message information 110 related to the message content 105 from the adjudication services 171. For example, the obtained message information can include contextual information such as medical information related to medical terms identified within the message content 105. The obtained message information may include priority information rendered by the adjudications services 171, which in turn may have obtained the priority information from other external sources. The priority information may be appended to the message information 110. Still further, obtained message information may include corrections used to modify the message information 110. For example, the message information 110 may include mischaracterized descriptive information related to a residential address. In one embodiment, the descriptive information is sent to the adjudication services 171, which determines whether the descriptive information is correct and, if not, updates the descriptive information.

In another example application, the message adjudicator 104a obtains classification levels related to the sender 101 from the classification services 172. The classification services 172 may execute on servers within protected military networks. Advantageously, the protected classification services 172 provide security, centralized control, and transparency to the collaborative message system 100.

In a further embodiment, the message adjudicator 104a filters the message content 118 based upon the modified message information (146). In one embodiment, the message adjudicator 104a filters classified information from the message content 105. For example, based upon an obtained classification level of the receiver 103 (e.g., as obtained from the classification services 172), the message adjudicator 104a filters message content 105 before the communications engine 102 sends it to the receiver 103. For example, the message adjudicator 104a may remove classified names and/or classified meeting locations from the message content 105 before sending it to the receiver 103.

In still another embodiment, the message adjudicator 104a filters message content 105 considered too sensitive for the receiver 103. For example, the message adjudicator 104a may implement age-based filtering by removing or blocking out message content 105 considered inappropriate for receiver 103. For example, the message adjudicator 104a may remove foul language, sexually-explicit language, violent language, etc. from message content 118 before sending it to a thirteen year old receiver.

Figure 1B:
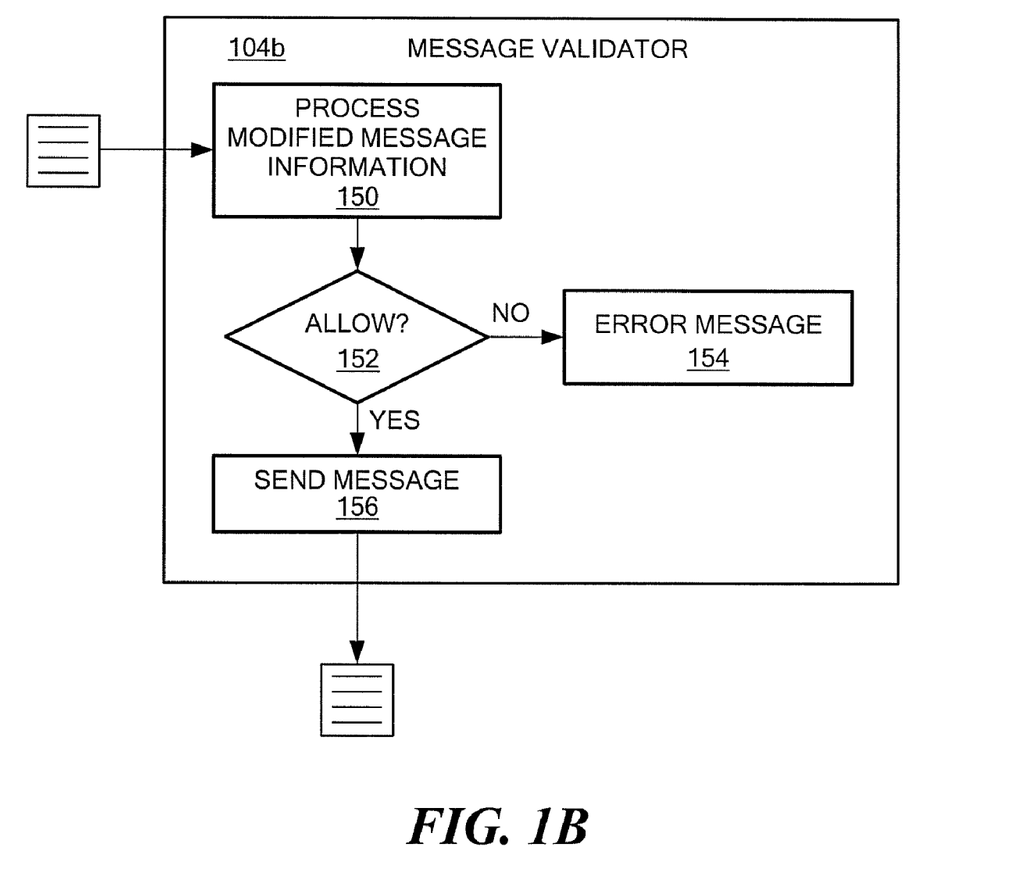
FIG. 1B is a block diagram of an embodiment of a message validator according to the invention.

The message adjudicator 104a sends a modified message 107 to receiver 103 or forwards the modified message 107 to one or more other message interrogators 104, such as the message validator 104b (148). Referring now to FIG. 1B, in which like elements with FIG. 1 are shown with like reference numerals, in one embodiment, the message validator 104b processes the modified message information (150) forwarded by one of the plurality of message interrogators 104 (e.g. the message adjudicator 104a) and allows or denies the message based upon the modified message information (152). In one embodiment, the message validator 104b allows the message and sends the message to the receiver 103 or to another one of the plurality of message interrogators 140 (156). In the same or different embodiment, the message validator 104b denies the message and sends an error message to the sender (154).

It should be noted that the communications engine 102 may include other message interrogators. As a non-limiting example, another one of the plurality of message interrogators 104 includes a message archiver that archives messages 105 related to an incident, such as the release of a bio-agent. Here, the message archiver collects messages 105 and stores them along with date/time. This may be used to "playback" messages related to an event for training purposes and/or to derive/modify procedures for mitigating the consequences of the event.

Figure 2:
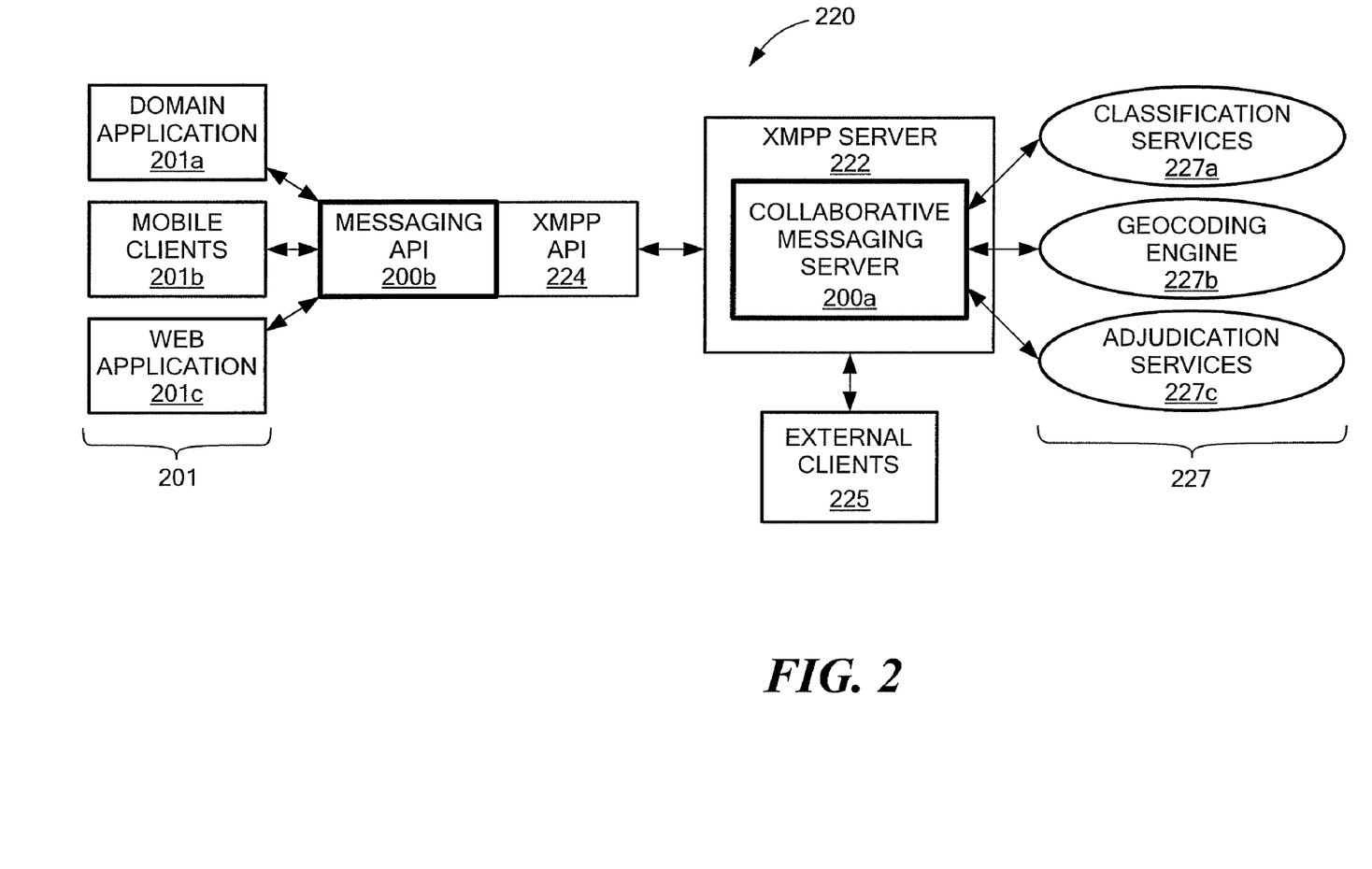
FIG. 2 is a block diagram of an exemplary environment incorporating the collaborative messaging system of FIG. 1.

Referring now to FIG. 2, an exemplary environment 220 incorporating the inventive concepts includes a collaborative messaging server 200a, which in one embodiment is a server extension to an Extensible Messaging and Presence Protocol (XMPP) server 222. As is well known in the art, XMPP is an open, extensible markup language (XML) based protocol used in conjunction with instant messaging (IM), including presence information for IM, such as buddy lists. It should be noted that the collaborative messaging server 200a may be a server extension for use with other protocol servers, such as a Voice-Over Internet Protocol (VOIP) server, as well as services such as AOL Instant Messenger™, and MSN Messenger. The collaborative messaging server 200a may be used to dynamically generate user contacts for a radio gateway system. In such a system, users communicate with each other using radio devices, such as walkie-talkies, in contact with one or more radio base stations.

The XMPP server 222 may be extended, for example, by using an XMPP application programming interface (API) 224, which includes capabilities to add functionality to core XMPP services. The XMPP server 222 further communicates with external clients 225 including commercial off-the-shelf components such as Pidgin, a multi-platform IM client. Further, the XMPP Server 222 may access a lightweight directory access protocol (LDAP) (not shown) for querying and modifying directory services.

The collaborative message server 200a includes a collaborative messaging system, as may be like the collaborative messaging system 100 described in conjunction with FIG. 1. The collaborative messaging system includes message filtering functionality, as may be similar to message interrogators 104 described in conjunction with FIG. 1. Clients 201, such as domain applications 201a, mobile clients 201b, and web applications 201c, use a collaborative messaging API 200b to extend and/or customize collaborative messaging system functionality. Clients 201, such as client 201b, may be similar to sender 101 and/or receiver 103, described in conjunction with in FIG. 1.

In one application of the exemplary environment 220, domain application clients 201a use the collaborative messaging API 200b to customize the collaborative messaging server 200a to add descriptive information to message information, as may be similar to message information 110 described in conjunction with FIG. 1. For example, domain application clients 201 a may add descriptive information related to reliability and/or trustworthiness of the message information. In still other applications, web application clients 201b use the collaborative messaging API 200b to customize the collaborative messaging server 200a to add information sources such as databases. This allows the collaborative messaging server 200a to access the databases for contextual purposes. For example, a web application administrator client may add a database comprising predefined automobile information for manufactures, models, years, and other features that clients 201 use to input/specify automobile information.

The collaborative messaging server 200a uses external services 227 to render a broad array of functionality. For example, in one embodiment, the collaborative messaging server 200a uses classifications services 227a to obtain classification level information pertaining to message content, as well as senders and receivers. Such information may be used to filter at least a portion of the messages, for example, by removing classified materials and/or sensitive materials within the message content.

In the same or different embodiment, the collaborative messaging server 200a uses a geocoding engine 227b to obtain geospatial information, such as a sender's and/or a receiver's position. Such information may be used to filter the message, for example, by comparing the sender's inputted location to the sender's location obtained from the geocoding engine. In one example application, the collaborative message server 200a modifies the inputted sender location with the obtained sender location, as may be useful when the sender input's inaccurate location information, for example, because the sender is lost or in unfamiliar surroundings.

The collaborative messaging server 200a uses adjudication services 227c to process message content and message information. For example, the adjudication services 227c may update message information entered by a sender with more restrictive values.

It will be understood by one of ordinary skill in the art that the collaborative messaging server 200a and collaborative message API 200b can function across multiple servers, such as a plurality of XMPP servers 222.

Figure 3:
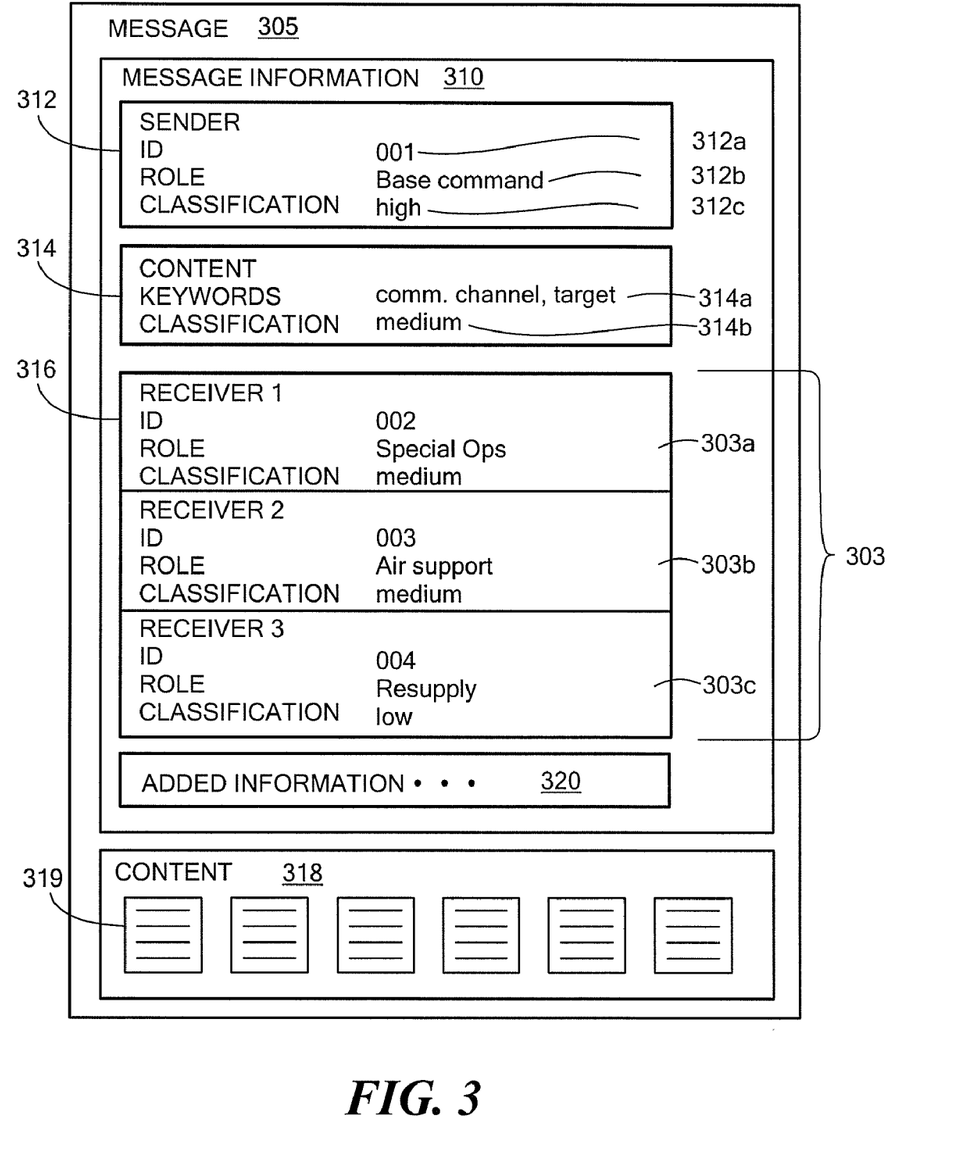
FIG. 3 is a block diagram of an embodiment of a message of the type which may be used with embodiments the collaborative messaging system of FIG. 1.

Referring now to FIG. 3, in a further embodiment, a message 305 of the type which may be used by collaborative message system 100 described in conjunction with FIG. 1, includes message information 310 and message content 318. The message information 310 includes message sender information 312 related to a sender of the message 305, as may be similar to sender 101 described in conjunction with FIG. 1, and content information 314 related to message content 318, as may be similar to message content 118 described in conjunction with FIG. 1. In a further embodiment, the message information 310 includes receiver information 316 related to a receiver of the message 305, as may be similar to receiver 103 described in conjunction with FIG. 1.

In one embodiment, the message sender information 312 includes a message sender identifier 312a, a message sender role 312b, and/or a message sender classification level 312c. The message sender identifier 312a is a unique identifier for the sender. For illustrative purposes only, the message sender identifier 312a in FIG. 3 equals "001." Example embodiments of the message sender identifier 312a include, but are not limited to, a number generated by a random-number generator or a primary key generated by a database management system. For one or both of these embodiments, the message sender identifier 312a is generated on a server and sent to a client device, as may be similar to the client devices described in conjunction with FIG. 1, during client device configuration and/or initialization. The message sender identifier 312a may be used by the collaborative messaging system to identify the message sender and confirm the message sender's credentials, including the message sender's classification level as will be described in more detail below.

The message sender role 312b identifies the role of the sender, for example, a first responder of an incident, a member of a medical team caring for victims of an accident, a law enforcement officer, a joint commander in the field, etc. For illustrative purposes only, the message sender role 312b in FIG. 3 is "Base command," indicating that the sender is the commander of a military base to support military operations. The collaborative messaging system may use message sender role 312b to determine message processing functions, such as those performed by one or more of the message interrogators (e.g., message adjudicator 104a described in conjunction with FIG. 1A). For example, a message adjudicator may process message information 310 for a message 305 sent by an emergency medical team member to add medical terminology and treatments.

The message sender classification level 312c identifies the classification level of the sender. In one embodiment, the collaborative message system includes three classification levels: high; medium; and low. For illustrative purposes only and according to this embodiment, the message sender classification level 312c in FIG. 3 equals "high", indicating that the sender has a high classification level. In another embodiment, the collaborative message system uses number rankings from high to low or low to high to indicate the classification levels, such as 1–4 where 1 indicates the highest classification level, and 4 the lowest.

The collaborative messaging system uses the classification levels to modify message content 318 and/or message information 310 and/or allow or deny messages 305 to message receivers which may or may not be viewable by the message receivers without the proper classification level. For example, the message sender may have a high classification level. The message sender may send a message 305 to a receiver with a low classification level. Here, the communications engine (i.e., one of the included message interrogators such as the message validator 104b described in conjunction with FIG. 1B) may deny the message 305 to the receiver because the receiver's classification level is too low. In another example, the communications engine may filter at least a portion of the message content 318, such as that portion deemed too classified for the receiver based upon the receiver's classification level.

In one embodiment, the message content information 314 includes keywords 314a and/or a content classification level 314b. The keywords 314b identify important concepts and references within the message content 318, such as topics of communications, names of persons, locations, hazardous materials, etc. For illustrative purposes only, the keywords 314b in FIG. 3 include "comm. channel" and "target." Comm. channel may indicate a communications channel for senders and/or receivers to use during communications. Target may indicate an intended target.

The keywords 314b may be used to modify message information 310. For example, the communications engine may include a message interrogator that searches for names of persons in a criminal database. If a person is found in the criminal database, the message interrogator may add information related to the person to the message information 310. This may assist message receivers, for example, by helping receivers to positively identify and apprehend the person during street patrols.

The content classification level 314c identifies the classification level of a message 305. For illustrative purposes only, the content classification level in FIG. 3 equals "medium." In one embodiment, the sender identifies an appropriate content classification level 314b based upon the sender's assessment of the message content 318 and/or message information 310. For example, for the above mentioned message content related to the communications channel and the target (as indicated by keywords 314a) the sender sets the content classification level 314b to medium, because the communications engine should not forward such information to senders and/or receivers with a low classification level.

The communications engine uses the content classification level 314b to determine whether the message 305 should be sent to the message receiver. For example, one of the message interrogators, such as the message validator 104b described in conjunction with FIG. 1B, may compare the content classification level 314b with a message receiver classification level and, based upon the comparison, allow or deny the message 305. For example, if the content classification level 314b is low and the receiver classification level is high, then the message validator allows the message 305 to be sent to the receiver.

In a further embodiment, the message receiver information 316 includes information related to one or more receivers 303 of the message 305. For example, message receiver information 316 related to a first receiver 303a, hereinafter referred to as RECEIVER 1, includes a message receiver identifier, a message receiver role, and/or a message receiver classification level. The message receiver information may further include information related to a second receiver 303b, hereinafter referred to as RECEIVER 2, and a third receiver 303c, hereinafter referred to as RECEIVER 3.

In one embodiment, the message receiver identifiers are unique identifiers for each of the receivers. For illustrative purposes only, the message receiver identifiers in FIG. 3 are "002", "003", and "004" for respective RECEIVER 1, RECEIVER 2, and RECEIVER 3. The message receiver identifies have similar function to the message sender identifier. For example, the communications engine may use the message receiver identifiers to track messages intended for the receivers.

The message receiver roles identify the role of each of the message receivers. For illustrative purposes only, the message receiver roles in FIG. 3 are "Special ops", "Air support", and "Resupply" for respective RECEIVER 1, RECEIVER 2, and RECEIVER 3. The message receiver roles have similar function to the message sender role. For example, the communications engine may use the message receiver roles to modify messages, such as by appending role-related information to the message 305.

In one embodiment, the message receiver classification levels are classification levels for each of the receivers. For illustrative purposes only, the message receiver classification levels in FIG. 3 are "medium", "medium", and "low" for respective RECEIVER 1, RECEIVER 2, and RECEIVER 3. In a further embodiment, the sender identifies an appropriate message receiver classification level based upon the sender's assessment of the message receiver's classification level. For example, for the above mentioned message content related to the communications channel and the target (as indicated by keywords 314a) for which the sender set the content classification level to medium, the sender may set the classification levels for RECEIVER 1 and RECEIVER 2 to medium, since Special Operations and Air support should receive such information, but sets the classification level for RECEIVER 3 to low, since Resupply does not need such information.

In one or more of the aforementioned embodiments, the sender inputs the message information 310 using, for example, a user interface and/or a client device button, as may be similar to those described above with reference to FIG. 1. Still further, at least a portion of the message information 310 is automatically generated and/or preconfigured.

Figure 4:
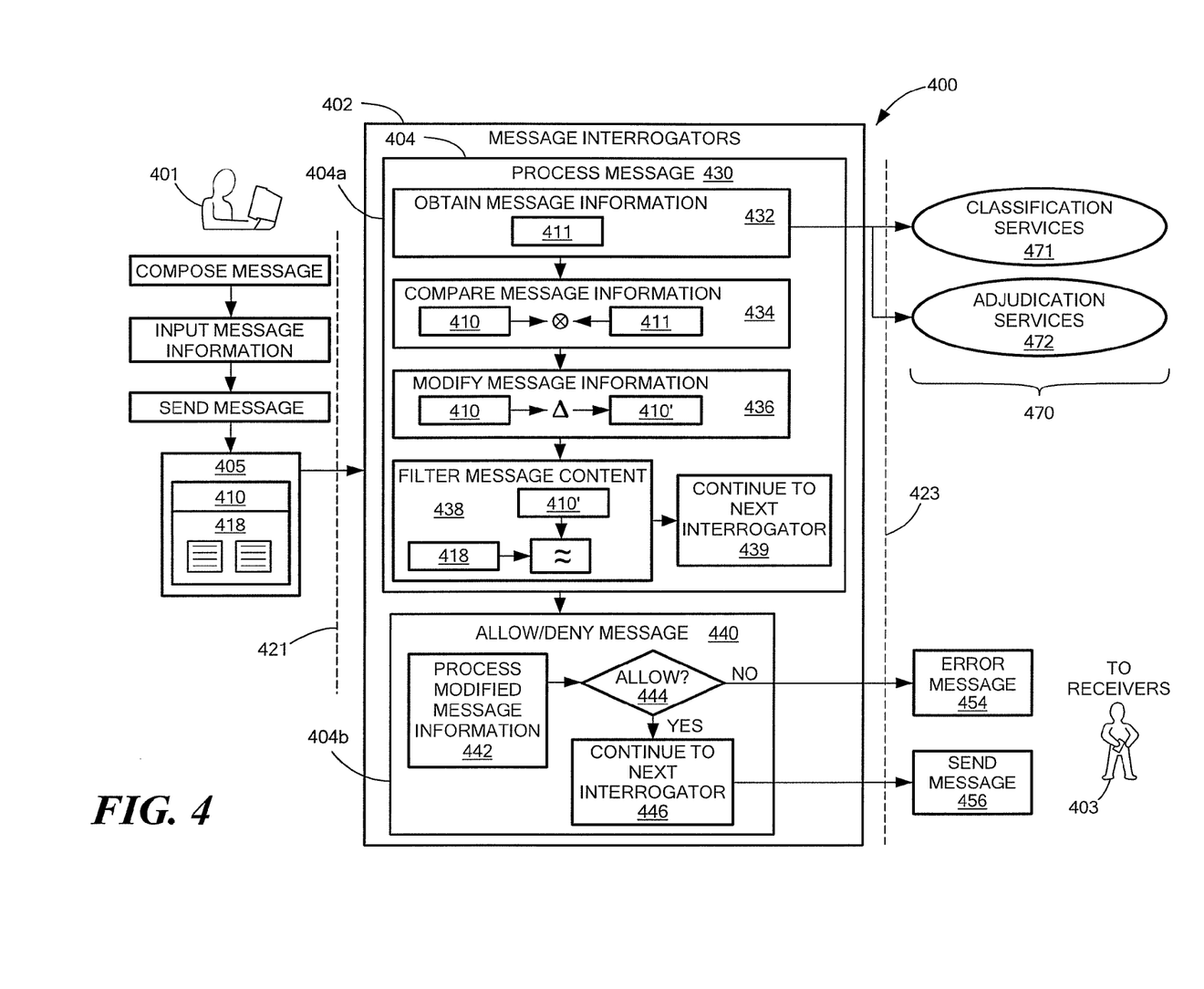
FIG. 4 is a flow diagram of an embodiment of a method of collaborative messaging according to the invention.

Referring now to FIG. 4, in one aspect, the inventive concepts described herein include a collaborative messaging method 400 including, in a communications engine 402, processing a message 405 from a sender 401 to a receiver 403 (step 430), the message 405 including message information 410 and message content 418 and allowing or denying the message 405 (step 440). Processing the message (step 430) further includes, in one 404a of a plurality of message interrogators 404, obtaining message information 411 (step 432), comparing the obtained message information 411 to the message information 410 (step 434), modifying the message information 410 to arrive at modified message information 410' (step 436), and filtering the message content 418 based upon the modified message information 410' (step 438). The method 400 includes continuing to the next message interrogator (step 439).

The method 400 further includes, in another one 404b of the plurality of message interrogators 404, allowing or denying the message 405 (step 440) including processing the modified message information 410' (step 442), allowing or denying the message 405 (step 444) based upon modified message information 410', and optionally, continuing to a next message interrogator 404 (step 446). If no other message interrogator 404 exists, then the method 400 may include sending the message 405 to the receiver 403.

Outside of the communications engine 402, the sender 401 may compose the message 405 on a client device using a user interface, as may be similar to the user interface described in conjunction with FIG. 1. The sender 401 inputs message information 410 and/or at least a portion of the message information 410 is pre-configured or automatically generated, as may be similar to pre-configured or automatically generated information described above in conjunction with FIG. 1. The sender 401 submits the message to the communications engine 402, where the message 405 is processed (step 430) and allowed or denied (step 440), as will be described below in more detail. In a further embodiment, the message 405 is sent over a network 421, such as the Internet or an intranet.

In one embodiment, obtaining message information (step 432) includes receiving message information from external services 470, as may include classification services 471 and/or adjudication services 472 and as may be similar to classification services and adjudication services described in conjunction with FIG. 1A. In a further embodiment, obtaining message information includes issuing a request for message information to the external services 470 and receiving the message information from the external services 470 in response to the request. The request may be sent over a network 423. In a further embodiment, the obtained message information 411 includes obtained sender information and/or obtained content information and/or obtained receiver information to be used when comparing the message information (step 434).

In another embodiment, comparing the message information (step 434) includes comparing message sender information with obtained sender information and/or comparing message content information with obtained content information and/or comparing message receiver information with obtained receiver information. For example, such comparisons may be used in step 436 to modify message information to more and/or less restrictive values. In one example, a message sender classification level is compared with an obtained sender classification level, and the message information is modified (step 436) to the more restrictive (i.e. the higher classification level) of the two values. This may useful to rectify any errors in the sender's 401 input of classification levels. For example, the sender 401 may incorrectly input a content classification level of "low." After receiving the obtained content classification level of "high" from the classification services 471, the message content classification level may be modified from low to high. The classification services may determine the correct content classification level by receiving at least a portion of the message content 418 from the communications engine (according to a further embodiment of the method 400) and reviewing the message content 418 according to various search parameters to flag any classified material, such as designated targets, friendly troop positions, platoon advancement plans, etc.

In another example, the obtained receiver classification level is lower than the message receiver classification level sent by the sender 401. In such an instance, the message receiver classification level may be lowered. As with the content classification example above, this may be useful to rectify any errors in the sender's inputted message receiver classification level. Still further, the sender 401 may not have supplied any message receiver classification level, in which case the communications engine uses the obtained receive classification level from the classification services 471 to set the receiver classification level. This reduces the burden on the sender 401 by eliminating the need for the sender 401 to remember and input the receiver's classification level. It also provides more secure control over classification levels and prevents any attempts to supply classified information to receivers who should not receive it, for example, because their clearance is too low.

In a further embodiment, filtering the message content (step 438) includes modifying at least a portion of the message content 418 based upon the modified message information 410'. For example, the message content 418 may include descriptive information related to an automobile driven by a suspect in a crime. The message information 410 may include reliability information sent along with the descriptive information. The reliability information may be low, because of the low credibility of an eye-witness supplying the descriptive information (as assessed by the sender 401 who is a police detective). Because of the low reliability of the descriptive information, the message content 418 may be modified to include inputted descriptive information from prior more reliable eye-witness reports, as well as more accurate automobile information from an automobile database, such as corrected year of manufacture based upon the make and model of the automobile.

In another example, the message content 418 is filtered by removing at least a portion of the message content 418. For example, message content 418 may include "A", "B", and "C." The obtained message information indicates that "C" is highly classified, and "C" is removed from the message content 418.

It should be noted that the method 400 may perform steps 432, 434, 436, 438 in an order other than those described or implied above. For example, message information may be obtained after message information is compared, since such the comparison may determine which information should be obtained. Still further, any one of the steps may be repeated, for example, message information may be compared in step 434, modified in step 435, and compared again in step 434.

In one embodiment, allowing or denying the message 405 (step 440) includes processing modified message information 410' to determine whether the message 405 should be allowed or denied (i.e. sent or not sent to the receiver 403). For example, the message content classification level may be compared with the message receiver classification level to determine whether the receiver 403 has the appropriate clearance to receive the message 405. TABLE 1 illustrates a set of possible classification level combinations and the outcome.

TABLE 1

| CONTENT CLASSIFICATION LEVEL | RECEIVER CLASSIFICATION LEVEL | OUTCOME |
| --- | --- | --- |
| HIGH | HIGH | ALLOW |
| HIGH | MEDIUM | DENY |
| HIGH | LOW | DENY |
| MEDIUM | HIGH | ALLOW |
| MEDIUM | MEDIUM | ALLOW |
| MEDIUM | LOW | DENY |
| LOW | HIGH | ALLOW |
| LOW | MEDIUM | ALLOW |
| LOW | LOW | ALLOW |

In still a further embodiment, if the outcome is to allow the message 405, the message 405 is sent to the receiver 403 (step 456). In yet another embodiment, if the outcome is to deny the message 405, an error message 454 is produced. For example, in one embodiment, the sender 401 receives an error message 454 that the message 405 was not sent. Such an error message may include an explanation of why the message 405 was not sent, as may be produced by another one of the message interrogators 404.

In still a further embodiment, the receiver 403 receives a message that the sender 401 attempted to send a message, but that it did not go through. In response, the receiver 403 (now acting as a sender 401) may attempt to contact the sender 401 (now acting as a receiver 403), for example, by composing another message and sending it to the sender 401 using the communications engine 402.

Figure 5:
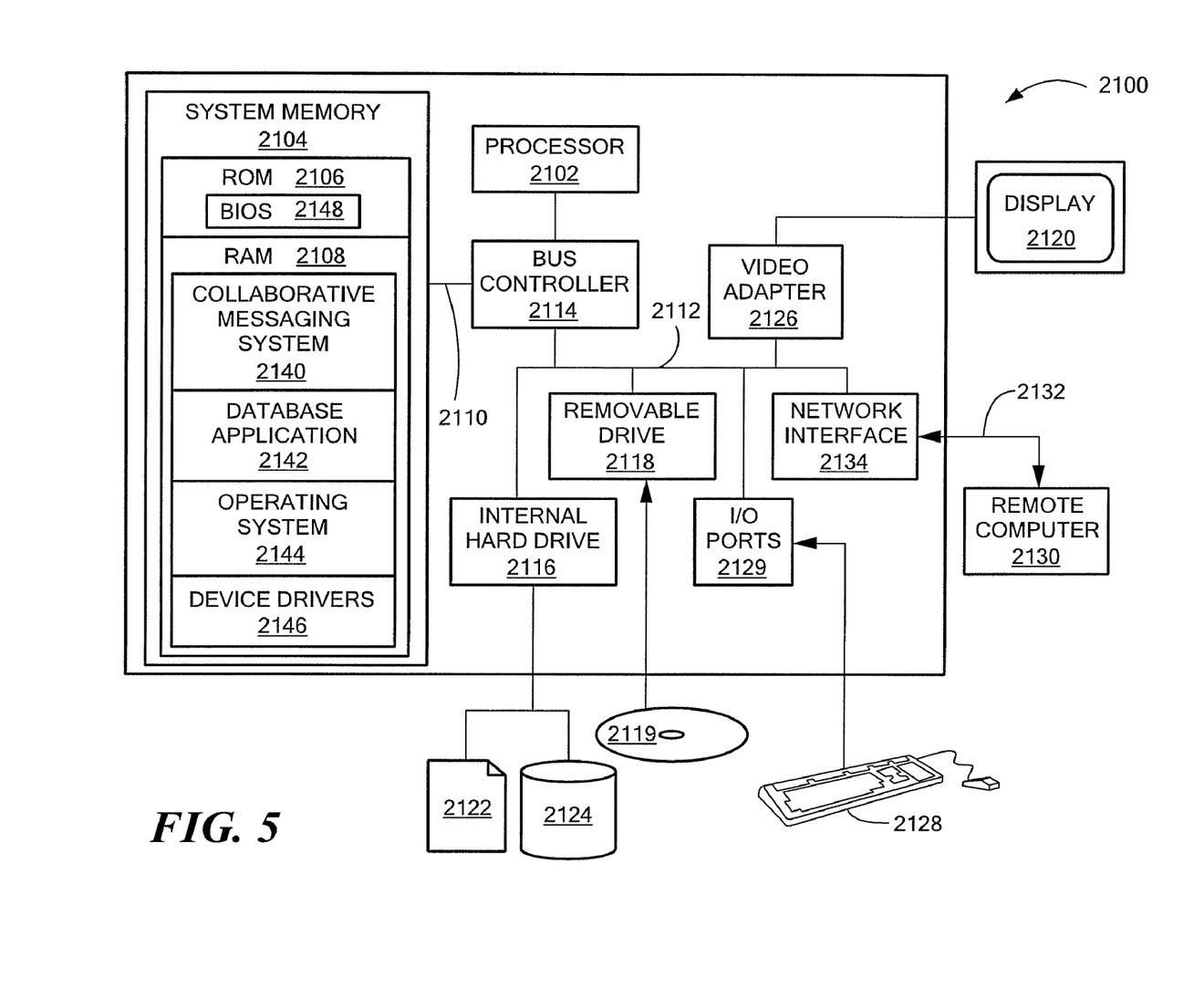
FIG. 5 is a diagram showing an exemplary hardware and operating environment of a suitable computer for use with embodiments of the invention.

FIG. 5 illustrates a computer 2100 suitable for supporting the operation of an embodiment of the collaborative messaging systems, concepts, and techniques described herein. The computer 2100 includes a processor 2102, for example, a dual-core processor, such as the AMD Athlon™ X2 Dual Core processor from the Advanced Micro Devices Corporation. However, it should be understood that the computer 2100 may use other microprocessors. Computer 2100 can represent any server, personal computer, laptop, or even a battery-powered mobile device such as a hand-held personal computer, personal digital assistant, or smart phone.

Computer 2100 includes a system memory 2104 which is connected to the processor 2102 by a system data/address bus 2110. System memory 2104 includes a read-only memory (ROM) 2106 and random access memory (RAM) 2108. The ROM 2106 represents any device that is primarily read-only including electrically erasable programmable read-only memory (EEPROM), flash memory, etc. RAM 2108 represents any random access memory such as Synchronous Dynamic Random Access Memory (SDRAM). The Basic Input/Output System (BIOS) 2148 for the computer 2100 is stored in ROM 2106 and loaded into RAM 2108 upon booting.

Within the computer 2100, input/output (I/O) bus 2112 is connected to the data/address bus 2110 via a bus controller 2114. In one embodiment, the I/O bus 2112 is implemented as a Peripheral Component Interconnect (PCI) bus. The bus controller 2114 examines all signals from the processor 2102 to route signals to the appropriate bus. Signals between processor 2102 and the system memory 2104 are passed through the bus controller 2114. However, signals from the processor 2102 intended for devices other than system memory 2104 are routed to the I/O bus 2112.

Various devices are connected to the I/O bus 2112 including internal hard drive 2116 and removable storage drive 2118 such as a CD-ROM drive used to read a compact disk 2119 or a floppy drive used to read a floppy disk. The internal hard drive 2116 is used to store data, such as in files 2122 and database 2124. Database 2124 includes a structured collection of data, such as a relational database. A display 2120, such as a cathode ray tube (CRT), liquid-crystal display (LCD), etc. is connected to the I/O bus 2112 via a video adapter 2126.

A user enters commands and information into the computer 2100 by using input devices 2128, such as a keyboard and a mouse, which are connected to I/O bus 2112 via I/O ports 2129. Other types of pointing devices that may be used include track balls, joy sticks, and tracking devices suitable for positioning a cursor on a display screen of the display 2120.

Computer 2100 may include a network interface 2134 to connect to a remote computer 2130, an intranet, or the Internet via network 2132. The network 2132 may be a local area network or any other suitable communications network.

Computer-readable modules and applications 2140 and other data are typically stored on memory storage devices, which may include the internal hard drive 2116 or the compact disk 2119, and are copied to the RAM 2108 from the memory storage devices. In one embodiment, computer-readable modules and applications 2140 are stored in ROM 2106 and copied to RAM 2108 for execution, or are directly executed from ROM 2106. In still another embodiment, the computer-readable modules and applications 2140 are stored on external storage devices, for example, a hard drive of an external server computer, and delivered electronically from the external storage devices via network 2132.

The computer-readable modules 2140 may include compiled instructions for implementing the collaborative messaging systems and methods described herein. In a further embodiment, the computer 2100 may execute various components of a communications engine as may be similar to that described in conjunction with FIG. 1. In still a further embodiment, the communications engine implements the components on different processors, for example, a first processor and a second processor. For example, the first processor implements a message adjudicator, as may be similar to message adjudicator 104a described in conjunction with FIG. 1A, and the second processor implements a message validator, as may be similar to message validator 104b described in conjunction with FIG. 1B. Advantageously, the division of processing function saves time and overhead and allows for asynchronous programming. For example, the message adjudicator may execute comparisons between message sender information and obtained message information related to a first message while the message validator allows and denies a second message.

Furthermore, collaborative messaging system data may be saved in internal hard drive storage 2116, read-in from removable drive 2118, or received via the network 2132 from remote computer 2130, and loaded into RAM 2108. For example, message sender information and/or obtained message information may be loaded into RAM 2108. The data may be stored in a database format to execute in a database application or in a file format, which can include, but is not limited to, a comma-delimited text file.

In a further embodiment, the first and second processors may be respective processors of a dual-core processor. Alternatively, the first and second processor may respective first and second computing devices. Output of the first and/or second processors may be rendered on display 2120.

The computer 2100 may execute a database application 2142, such as Oracle™ database from Oracle Corporation, to model, organize, and query data stored in database 2124. The data may be used by the computer-readable modules and applications 2140 and/or passed over the network 2132 to the remote computer 2130 and other systems.

In general, the operating system 2144 executes computer-readable modules and applications 2140 and carries out instructions issued by the user. For example, when the user wants to execute a computer-readable module 2140, the operating system 2144 interprets the instruction and causes the processor 2102 to load the computer-readable module 2140 into RAM 2108 from memory storage devices. Once the computer-readable module 2140 is loaded into RAM 2108, the processor 2102 can use the computer-readable module 2140 to carry out various instructions. The processor 2102 may also load portions of computer-readable modules and applications 2140 into RAM 2108 as needed. The operating system 2144 uses device drivers 2146 to interface with various devices, including memory storage devices, such as hard drive 2116 and removable storage drive 2118, network interface 2134, I/O ports 2129, video adapter 2126, and printers.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A collaborative messaging system, comprising:
  a communications engine executing in a microprocessor, comprising:
    a plurality of message interrogators to process a message from a sender to a receiver, the message comprising message sender information and message content information, comprising:
      a message adjudicator configured to:
        compare message information from the sender with message information obtained by the message adjudicator, the obtained message information comprising message sender information, message receiver information, and message content information;
        modify the message information from the sender to a higher classification level of the message sender information from the sender and the obtained message sender information;
        further modify the message information to a higher classification level of the message content information from the sender and the obtained message content information; and
        filter the message content based upon the further modified message information and the obtained receiver information; and
      a message validator configured to allow or deny the message based upon the further modified message information and the obtained message receiver information.

2. The system of claim 1, wherein the message adjudicator filters the message content by removing classified material from the message content.

3. The system of claim 1, wherein the message adjudicator filters the message content by removing offensive material from the message content.

4. A collaborative messaging method, comprising:
- in a communications engine executing in a microprocessor, processing a message from a sender to a receiver, the message comprising message sender information, message content, and message content information, comprising:
  - comparing message information from the sender with obtained message information, the obtained message information comprising obtained message sender information, obtained message receiver information, and obtained message content information;
  - modifying the message information from the sender to a higher classification level of the message sender information from the sender and the obtained message sender information;
  - further modifying the message information to a higher classification level of the message content information from the sender and the obtained message content information;
  - filtering the message content based upon the further modified message information and the obtained message receiver information; and
  - allowing or denying the message based upon the further modified message information and the obtained message receiver information.

5. The method of claim 4, further comprising modifying the message information from the sender to a lower classification level of the message sender information from the sender and the obtained message sender information.

6. The method of claim 4, wherein the message sender information further comprises message sender classification information and the obtained message information further comprises obtained sender classification information, and further comprising:
- modifying the message information to a higher classification level of the message sender classification information and the obtained sender classification information.

7. The method of claim 4, wherein the message content information further comprises message content classification information and the obtained message information further comprises obtained content classification information, and further comprising:
- modifying the message information to higher classification level of the message content classification information and the obtained content classification information.

8. The method of claim 4, wherein the message information further comprises message receiver classification information and the obtained message information further comprises obtained receiver classification information, and further comprising:
- modifying the message information to a higher classification level of the message receiver classification information and the obtained receiver classification information.

9. The method of claim 4, wherein filtering the message content further comprises: removing classified material from the message content.

10. The method of claim 4, wherein filtering the message content further comprises: removing offensive material from the message content.

* * * * *